(12) United States Patent
Nakamura

(10) Patent No.: US 9,505,271 B2
(45) Date of Patent: Nov. 29, 2016

(54) TIRE

(75) Inventor: Takamitsu Nakamura, Higashiyamato (JP)

(73) Assignee: BRIDGESTONE CORPORATION, Tokyo (JP)

( * ) Notice: Subject to any disclaimer, the term of this patent is extended or adjusted under 35 U.S.C. 154(b) by 625 days.

(21) Appl. No.: 13/577,779

(22) PCT Filed: Feb. 9, 2011

(86) PCT No.: PCT/JP2011/052736
§ 371 (c)(1),
(2), (4) Date: Sep. 24, 2012

(87) PCT Pub. No.: WO2011/099515
PCT Pub. Date: Aug. 18, 2011

(65) Prior Publication Data
US 2013/0008576 A1    Jan. 10, 2013

(30) Foreign Application Priority Data

Feb. 9, 2010   (JP) .................................. 2010-026818

(51) Int. Cl.
*B60C 11/13* (2006.01)
*B60C 11/03* (2006.01)

(52) U.S. Cl.
CPC .......... *B60C 11/032* (2013.04); *B60C 11/0304* (2013.04); *B60C 11/0306* (2013.04);
(Continued)

(58) Field of Classification Search
CPC . B60C 11/032; B60C 11/042; B60C 11/045; B60C 11/047; B60C 11/1315; B60C 11/1323; B60C 2011/1361; B60C 2011/0353
USPC ........................... 152/209.17, 209.18, 209.24
See application file for complete search history.

(56) References Cited

U.S. PATENT DOCUMENTS 3,409,064 A * 11/1968 Lonsdale .................. 152/209.17
4,462,446 A *  7/1984 Goergen et al. .......... 152/209.18
(Continued)

FOREIGN PATENT DOCUMENTS

CN        102307736 A    1/2012
EP      0 093 071 A2    11/1983
(Continued)

OTHER PUBLICATIONS

English machine translation of JP2006-182126, dated Jul. 2006.*
(Continued)

*Primary Examiner* — Steven D Maki
*Assistant Examiner* — Robert Dye
(74) *Attorney, Agent, or Firm* — Sughrue Mion, PLLC

(57) ABSTRACT

A pneumatic tire 1 according to the present invention comprises at least land portion formed by circumferential groove 3,5 extending in circumferential-direction. The land portion includes land portion 11 having groove side wall 17 forming the circumferential groove 3 and land portion 15 having groove side wall 19A forming the circumferential groove 3. The groove side wall 17 and the groove side wall 19A meander in the circumferential-direction in surface view. A groove width of the circumferential groove 3 in width-direction changes in predetermined cycles in the circumferential-direction. The land portion 15 includes wide land portion in which width of the land portion in the width-direction is predetermined width, and narrow land portion in which the width in the width-direction is narrower than the predetermined width. A surface of the wide land portion is provided with recess portion 23 recessed inward in radial-direction from surface of the land portion 15.

5 Claims, 5 Drawing Sheets

(52) U.S. Cl.
CPC ... *B60C2011/0346* (2013.04); *B60C 2011/0353* (2013.04); *B60C 2011/0381* (2013.04); *B60C 2011/0383* (2013.04); *B60C 2011/1361* (2013.04)

(56) References Cited

U.S. PATENT DOCUMENTS

| | | | |
|---|---|---|---|
| 4,484,610 A | 11/1984 | Wallet et al. | |
| 5,373,882 A * | 12/1994 | Nakagawa | 152/209.28 |
| 6,026,874 A * | 2/2000 | Shibata et al. | 152/209.2 |
| 6,601,624 B2 * | 8/2003 | Ratliff, Jr. | 152/209.19 |
| 2012/0018068 A1 | 1/2012 | Kiwaki et al. | |

FOREIGN PATENT DOCUMENTS

| | | | |
|---|---|---|---|
| GB | 1351392 | * | 4/1974 |
| JP | 6-143937 A | | 5/1994 |
| JP | 07-276920 | * | 10/1995 |
| JP | 2667771 B2 | | 6/1997 |
| JP | 10-211805 A | | 8/1998 |
| JP | 2002-225511 | * | 8/2002 |
| JP | 2004-351953 A | | 12/2004 |
| JP | 2006-160055 A | | 6/2006 |
| JP | 2006-182126 | * | 7/2006 |
| WO | 2009/004408 A1 | | 1/2009 |
| WO | 2010/090327 A1 | | 8/2010 |

OTHER PUBLICATIONS

English machine and partial translation of JP2002-225511, dated Aug. 2002.*
English machine translation of JP07-276920, dated Oct. 1995.*
International Search Report, PCT/JP2011/052736, Mar. 29, 2011.
Extended European Search Report issued in European Application No. 11742258.4 dated Apr. 15, 2014.
Chinese Office Action issued in European Application No. 201180008608.3 dated May 6, 2014.

* cited by examiner

TIRE

CROSS REFERENCE TO RELATED APPLICATIONS

This application is a National Stage of International Application No. PCT/JP2011/052736 filed Feb. 9, 2011, claiming priority based on Japanese Patent Application No. 2010-026818 filed Feb. 9, 2010, the contents of all of which are incorporated herein by reference in their entirety.

TECHNICAL FIELD

The present invention relates to a tire, and particularly relates to a tire capable of achieving both drainage performance and wear resistance.

BACKGROUND ART

Conventionally, pneumatic tires (hereinafter, tires) using various tread patterns have been developed to make improvements for noise during vehicle running and drainage performance during running on a wet road (see Patent Document 1, for example).

A tire described in Patent Document 1 is provided with grooves which extend in a tire circumferential direction and in which groove side walls on both sides in a tread width direction are formed in a sinusoidal shape in a tread surface view.

PRIOR ART DOCUMENT

Patent Document

Patent Document 1: Japanese Patent Application Publication No. 2004-351953

SUMMARY OF THE INVENTION

The tire described in the above Patent Document 1, however, has a problem that wear resistance deteriorates in a land portion provided between the grooves adjacent to each other in a tread width direction because the rigidity of the land portion is not uniform in a tire circumferential direction.

In view of this, an objective of the present invention is to provide a tire improved in wear resistance in addition to drainage performance.

In order to solve the above-mentioned problem, the present invention has features as described below. The first feature of the present invention is summarized as a tire (pneumatic tire 1) comprising at least a land portion (e.g., land portion 15) formed by a main groove (e.g., circumferential groove 3,5) extending in a tire circumferential direction, the land portion including: a first land portion (e.g., land portion 11) having a first groove wall (e.g., groove side wall 17) forming the main groove; and a second land portion (e.g., land portion 15) having a second groove wall (e.g., groove side wall 19A) forming the main groove, wherein the first groove wall and the second groove wall meander in the tire circumferential direction in a tread surface view, a groove width of the main groove in a tread width direction changes in predetermined cycles in the tire circumferential direction, the land portion includes: a wide land portion (wide land portion 21A) in which a width of the land portion in the tread width direction is a predetermined width; and a narrow land portion (narrow land portion 21B) in which the width of the land portion in the tread width direction is narrower than the predetermined width, and a surface of the wide land portion is provided with a recess portion (recess portion 23) recessed inward in a tire radial direction from a surface of the land portion.

According to the above features, the first groove wall and the second groove wall meander in the tire circumferential direction in the tread surface view, and the groove width of the main groove changes in predetermined cycles in the tire circumferential direction. In this configuration, when the tire rotationally moves on a water film on a wet road surface, water flows occur along the meandering of the first groove wall and the second groove wall in the main groove. In other words, along with the decrease in the groove width of the main groove, the flows of water in the main groove advance in directions of extended lines of streamlines along inner surfaces of the first groove wall and the second groove wall. Thus, the water flows intersect each other and then are drained in those directions. Hence, drainage performance is improved as compared to the case of the conventional circumferential groove.

In addition, the surface of the wide land portion is provided with the recess portion recessed inward in a tire radial direction from the surface of the land portion. In this configuration, when a tread comes into contact with a road surface and the land portion deforms, rubber in the deformed portion moves into the recess portion and thus the recess portion serves as an escape for the land portion. The rigidity of the land portion (the wide land portion and the narrow land portion) is more likely to be uniform in the tire circumferential direction. Accordingly, the ground contact pressure of the land portion is made to be uniform in the tire circumferential direction and the wear resistance can be thus improved. In addition, water between the tread and the road surface can be absorbed by the recess portion and drainage performance is thus further surely improved.

The second feature of the present invention according to the first feature of the present invention is summarized as, in the tread surface view, the first groove wall and the second groove wall are symmetric to each other with respect to a center line passing through a center of the main groove in the tread width direction.

The third feature of the present invention according to the first or second feature of the present invention is summarized as, in the tread surface view, the recess portion is formed in such a tapered shape that a width dimension of the recess portion in the tread width direction gradually becomes smaller toward an end portion of the recess portion in the tire circumferential direction.

The fourth feature of the present invention according to the first to third features of the present invention is summarized as a length (a circumferential direction length L) of the recess portion in the tire circumferential direction is set to be twice to ten times a largest width dimension (W2) of the recess portion in the tread width direction, and the largest width dimension of the recess portion in the tread width direction is set to be 10% to 20% of a largest width dimension (W0) of the wide land portion in the tread width direction.

The fifth feature of the present invention according to the first to fourth features of the present invention is summarized as a depth (D1) of the recess portion in the tire radial direction is set to be 2.5% to 50% of a depth (D0) of the main groove in the tire radial direction.

MODES FOR CARRYING OUT THE INVENTION

A pneumatic tire according to an embodiment of the present invention will be described in detail below based on the drawings. Specifically, description will be given of (1) Overall Configuration of Pneumatic Tire, (2) Detailed Configuration of Circumferential Groove 3, (3) Detailed Configuration of Land Portion 15, (4) Explanation of Drainage Performance by Pulsation Main Groove, (5) Comparative Evaluation, (6) Operations and Effects, and (7) Other Embodiments of Present Invention.

Note that the drawings are schematic and thicknesses of material layers, proportions thereof, and the like are different from the actual ones. Accordingly, specific thicknesses, dimensions, and the like should be determined in consideration of the following descriptions. Moreover, the drawings include parts showing the dimensional relationships and proportions different from each other.

(1) Overall Configuration of Pneumatic Tire

Figure 1:
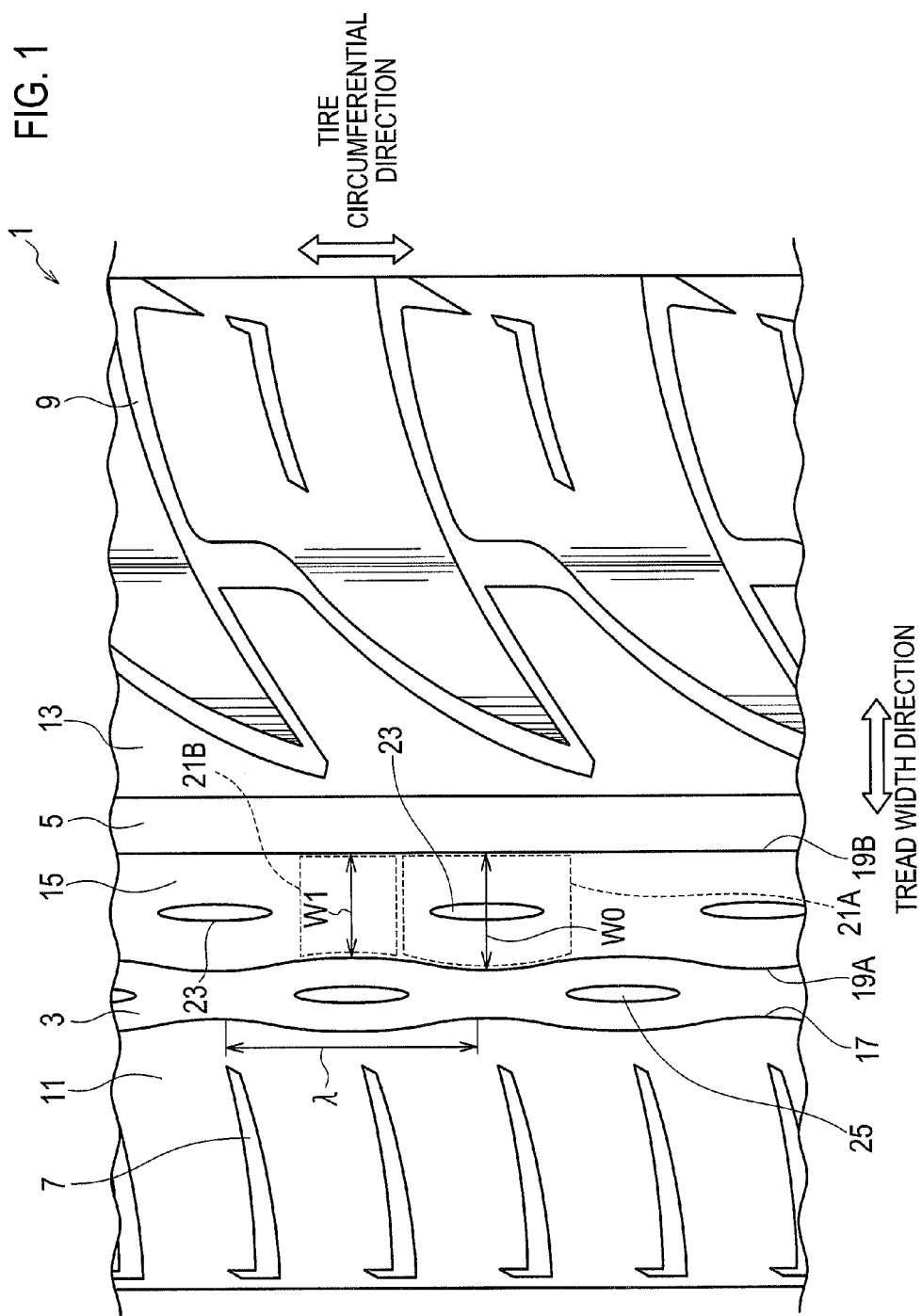
FIG. 1 is a tread pattern of a pneumatic tire according to an embodiment of the present invention.

An overall configuration of a pneumatic tire according to the embodiment will be first described by using FIG. 1. FIG. 1 shows a tread pattern of the pneumatic tire according to the embodiment of the present invention.

A pneumatic tire 1 and includes land portions 11, 13 and 15 which extend in a tire circumferential direction and which come into contact with a road surface. The land portion 15 is formed in a rib shape.

A circumferential groove 3 (a pulsation main groove to be described later) extending in a tire circumferential direction is formed between the land portions 11 and 15. In addition, a circumferential groove 5 being adjacent to the circumferential groove 3 and extending in the tire circumferential direction is formed between the land portions 13 and 15. In other words, the land portions 11, 13 and 15 are formed by the circumferential grooves 3 and 5.

Lug grooves 7 extending in a tread width direction are formed on an outer side of the circumferential groove 3 in a tread width direction. In addition, lateral grooves 9 extending in the tread width direction are formed on an outer side of the circumferential groove 5 in the tread width direction.

The land portion 11 has a groove side wall 17 (a first groove wall) forming the circumferential groove 3. The land portion 15 has a groove side wall 19A (a second groove wall) forming the circumferential groove 3, and a groove side wall 19B (a second groove wall) forming the circumferential groove 5.

(2) Detailed Configuration of Circumferential Groove 3

Figure 2:
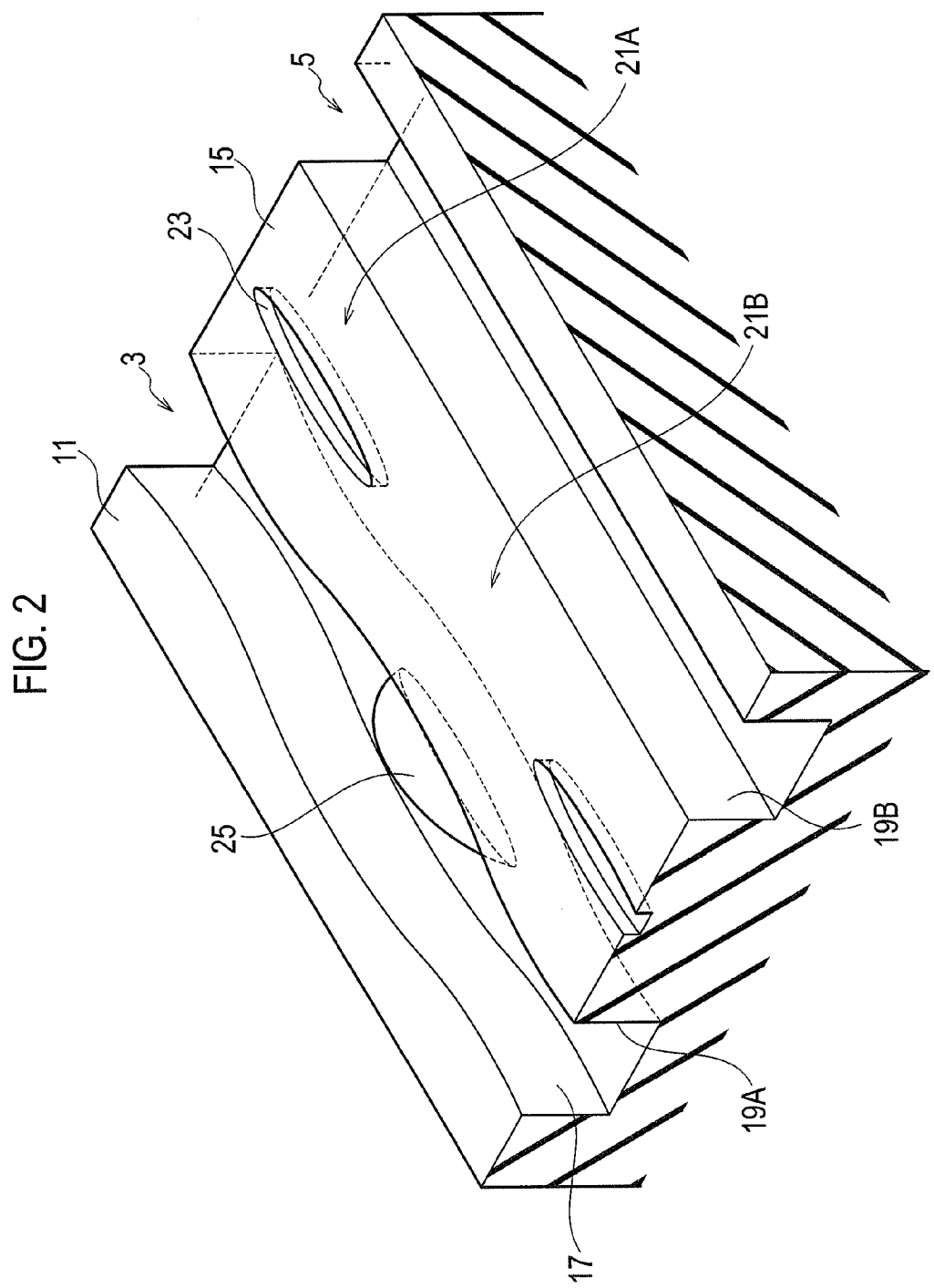
FIG. 2 is a perspective view showing a circumferential groove 3 and its vicinity.
Figure 3:
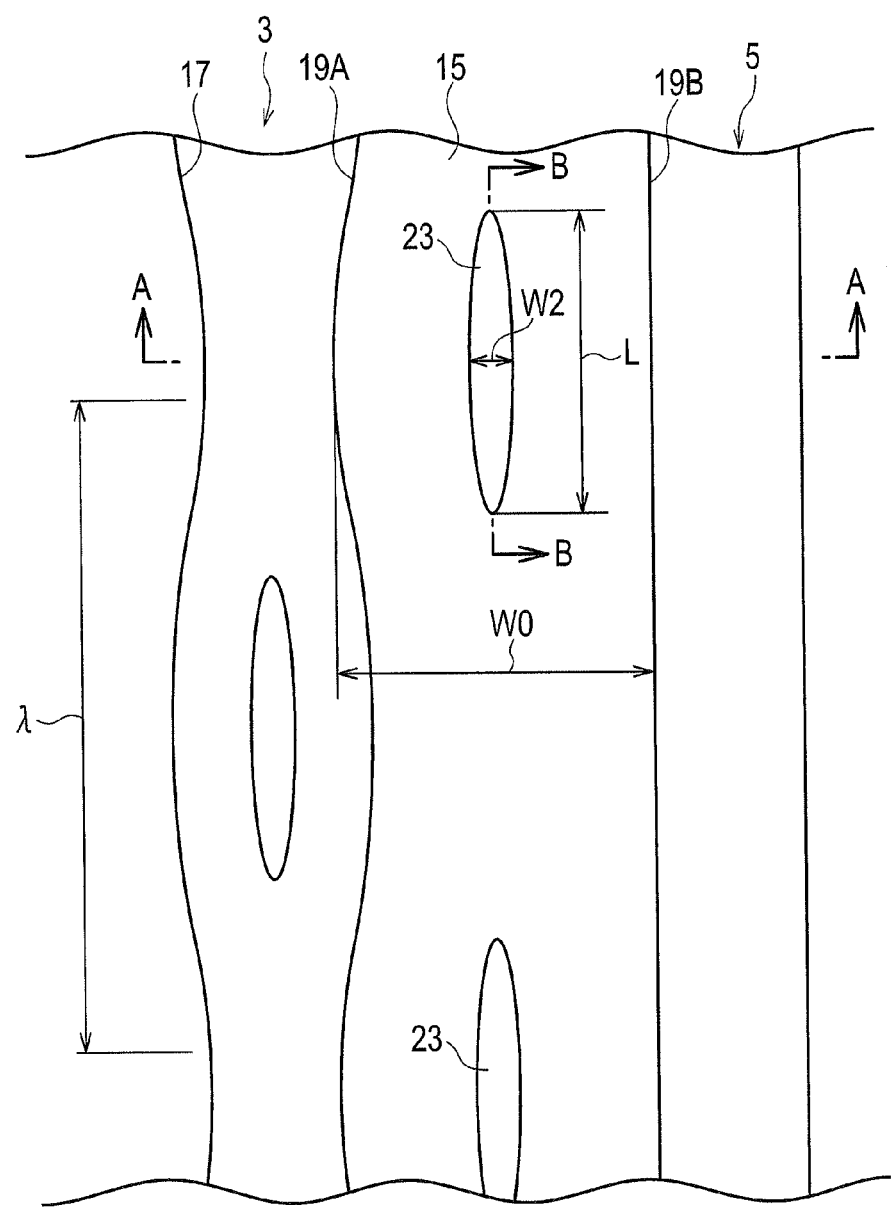
FIG. 3 is an enlarged view of a main part of FIG. 1.

Next, a detailed configuration of the above-mentioned circumferential groove 3 will be described with reference to FIGS. 1 to 3. FIG. 2 is a perspective view showing the circumferential groove 3 and its vicinity. FIG. 3 is an enlarged plan view of a main part of FIG. 2.

As shown in FIGS. 1 to 3, the circumferential groove 3 is formed by the groove side wall 17 and the groove side wall 19A. The groove side wall 17 and the groove side wall 19A meander in the tire circumferential direction in a tread surface view. The groove side wall 17 and the groove side wall 19A are provided symmetric to each other with respect to the center line of the circumferential groove 3. For example, wavelengths respectively of the groove side wall 17 and the groove side wall 19A are misaligned from each other by a predetermined wavelength (a half-wavelength, for example).

The circumferential groove 3 has a groove width which changes in predetermined cycles in the tire circumferential direction. Note that the groove width of the circumferential groove 3 refers to a width in the tread width direction and refers to a distance from any point on the groove side wall 17 to the groove side wall 19A in the tread width direction.

The groove width of the circumferential groove 3 changes at a cycle $\lambda$ in the tire circumferential direction (see FIG. 1). The groove side wall 17 and the groove side wall 19A each have a predetermined amplitude in the tread width direction. In other words, the groove side wall 17 and the groove side wall 19A change at the cycle $\lambda$ in the tire circumferential direction in the tread surface view.

A Raised portions 25 is formed in the circumferential groove 3 described above. The raised portion 25 is formed in a shape protruding outward in a radial direction from a groove bottom of the circumferential groove 3. The raised portion 25 is formed in a shape elongated in the tire circumferential direction in the tread surface view. The raised portion 25 is formed in portion where the width of the circumferential groove 3 in the tread width direction is wide.

(3) Detailed Configuration of Land Portion 15

Figure 4:
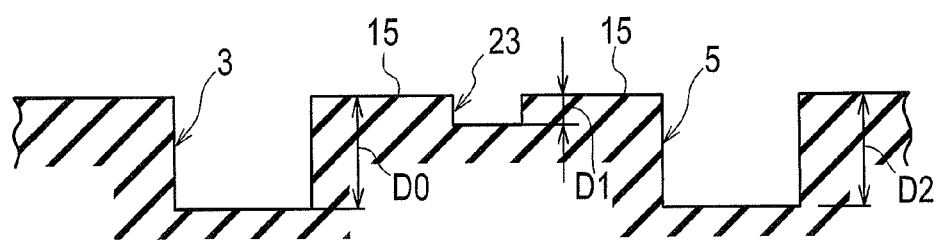
FIG. 4 is a cross-sectional view taken along the line A-A of FIG. 3.
Figure 5:
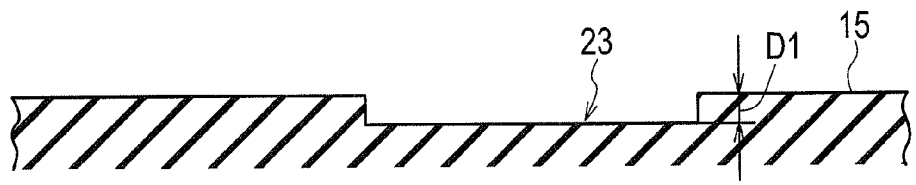
FIG. 5 is a cross-sectional view taken along the line B-B of FIG. 3.

Next, a detailed configuration of the abovementioned land portion 15 will be described with reference to FIGS. 1 to 5. Note that FIG. 4 is a cross-sectional view taken along the line A-A of FIG. 3. FIG. 5 is a cross-sectional view taken along the line B-B of FIG. 3.

As shown in FIGS. 1 to 3, the land portion 15 includes wide land portions 21A and narrow land portions 21B. A wide land portion 21A, the width of the land portion 15 in the tread width direction is a predetermined width. A land portion 21A is adjacent to a portion of the circumferential groove 3 whose width in the tread width direction is narrow. Meanwhile, A narrow land portion 21B is continuous with adjacent the wide land portion 21A and the width of the land portion 15 is narrower than the predetermined width in the narrow land portion 21B. The narrow land portion 21B is adjacent to a portion of the circumferential groove 3 whose width in the tread width direction is wide. Specifically, the widest width dimension in the land portion 15 is W0 in the wide land portion 21A, and the narrowest dimension thereof is W1 in the narrow land portion 21B. In the embodiment, a recess portion 23 is formed within the range of the wide land portion 21A.

The recess portion 23 is formed in a surface of the wide land portion 21A. The recess portion 23 is recessed inward in the tire radial direction from a surface of the land portion 15. The recess portion 23 is formed in an elliptical shape in the tread surface view, and is formed in such a tapered shape that the width dimension of the recess portion 23 in the tread width direction gradually becomes smaller toward end portions thereof in the tire circumferential direction. Note that it is preferable to provide the recess portion 23 at the center of the wide land portion 21A in the tread width direction.

In addition, the largest width dimension of the recess portion 23 is W2, and the largest width dimension of the wide land portion 21A in the land portion 15 is W0. The width W2 is set to be 10% to 20% of the width W0, and preferably 14% to 16% thereof. Note that 15% thereof is most preferable. Here, in the case where the width W2 is less than 10%, the recess portion 23 is too small in the tread width direction. Hence, the rigidity of the land portion 15 becomes high and thus wear resistance deteriorates. In contrast, in the case where the width W2 is more than 20%, the recess portion 23 is too large in the tread width direction. Hence, the rigidity of the land portion 15 becomes low and thus the wear resistance deteriorates.

Moreover, a circumferential direction length L of the recess portion 23 in the tire circumferential direction is set to be twice to ten times the largest width dimension W2 of the recess portion 23 in the tread width direction, and preferably five to eight times the largest width dimension W2.

In addition, as shown in FIGS. 4 and 5, a depth of the circumferential groove 3 is D0, a depth of the recess portion 23 is D1, and a depth of the circumferential groove 5 is D2. The depth D0 and the depth D2 are almost equal to each other, but the depth D1 is formed so as to be shallower than the depths D0 and D2. Additionally, the depth D1 of the recess portion 23 in the tire radial direction is set to be 2.5% to 50% of the depth D0 of the circumferential groove 3 in the tire radial direction, and particularly preferably 6% to 9% thereof. Here, in the case where the depth D1 is less than 2.5%, a capacity of the recess portion 23 becomes too small and the drainage performance thereby deteriorates. In contrast, in the case where the depth D1 is more than 50%, the capacity of the recess portion 23 becomes too large. Hence, the rigidity of the land portion 15 becomes low and thus the wear resistance deteriorates. Accordingly, in the case where the depth D1 is in the range of 2.5% to 50%, the drainage performance is high and wear resistance is also high.

(4) Explanation of Drainage Performance by Pulsation Main Groove

Figure 6:
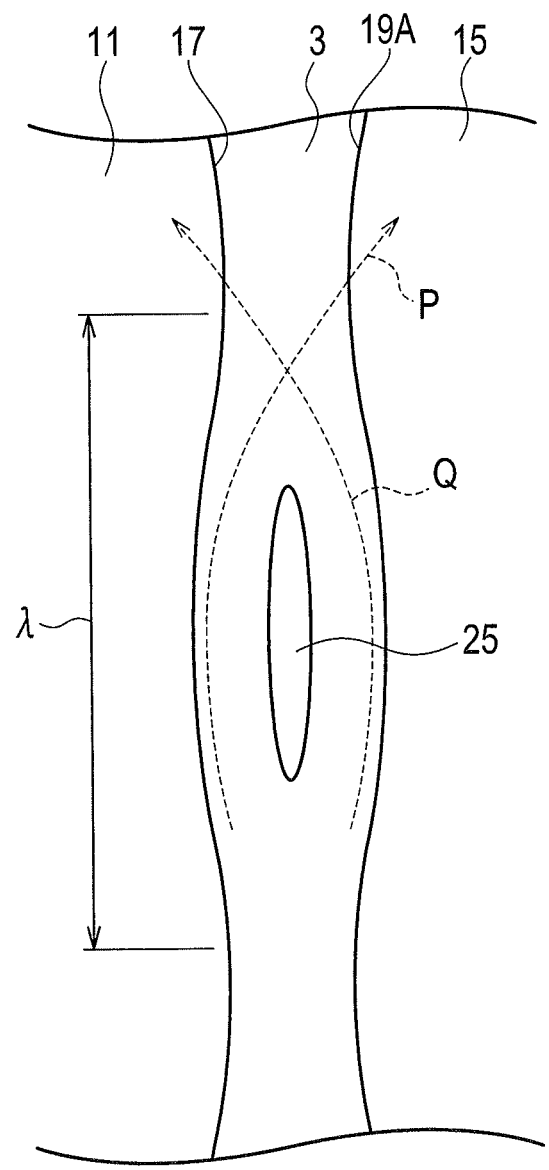
FIG. 6 is a schematic diagram showing a state where water is drained from a pulsation main groove.

Next, drainage performance by the circumferential groove 3 which is a pulsation main groove will be described by using FIG. 6. FIG. 6 is a schematic diagram showing a state where water is drained from the circumferential groove 3.

As shown in FIG. 6, when the pneumatic tire 1 rotationally moves on a water film on a wet road surface, water in the circumferential groove 3 flows in a streamline shape along inner surfaces of the groove side wall 17 and the groove side wall 19A in directions of arrows P and Q illustrated by broken lines. Then, along with the decrease in the groove width of the circumferential groove 3, flows of water in the circumferential groove 3 advance in directions of extended lines of the streamlines (the directions of the arrows P and Q) along the inner surfaces of the groove side wall 17 and the groove side wall 19A. Thus, the water flows intersect each other and then are drained. Hence, the drainage performance is improved as compared to the case of the conventional circumferential groove.

(5) Comparative Evaluation

Next, in order to further clarify the effects of the present invention, description will be given of comparative evaluation using the pneumatic tires according to Comparative Example and Example described below. Specifically, description will be given of (5-1) Configuration of Each Pneumatic Tire and (5-2) Evaluation Results. Note that the present invention is not limited at all to these examples.

(5-1) Configuration of Each Pneumatic Tire

Data on each pneumatic tire was measured under the conditions shown below.

Tire size: 225/45R17
Rim/wheel size: 17×7J
Type of tire: Normal tire (tire other than winter tires)
Type of vehicle: Japanese sedan car
Load condition: 600N+weight of driver No recess portions were provided in the pneumatic tire according to Comparative Example. In contrast, the recess portions described in the aforementioned embodiment were provided in the pneumatic tire according to Example.

(5-2) Evaluation Results

Evaluation results of each pneumatic tire are described with reference to Tables 1 to 4. Note that numerical values in Tables 1 to 4 are relative indexes, and the cases of Comparative Example are set as 100.

In a wear resistance brake test, a vehicle fitted with each type of pneumatic tires was driven for 10,000 km and uneven wear (the amount of wear compared to a brand-new tire) in the pneumatic tires fitted to the vehicle was measured. Note that a smaller index indicates a smaller amount of wear and less occurrence of uneven wear.

In a WET brake test, braking distances at which test vehicles fitted with respective types of pneumatic tires and travelling at 60 km/h on a WET road surface took to stop by sudden braking were compared and evaluated. Note that a larger index indicates a shorter braking distance and a better braking performance.

(5-2-1) Evaluation Result 1

First, as shown in Table 1, Example in which the recess portions were provided in the pneumatic tire and Comparative Example in which no recess portions were provided in the pneumatic tire were compared and evaluated.

TABLE 1

|  | Comparative Example (No Recess portions) | Example (Recess portions Present) |
| --- | --- | --- |
| Wear Resistance (Index) | 100 | 105 |
| Braking Performance on WET Road Surface (Index) | 100 | 103 |

(5-2-2) Evaluation Result 2

Next, as shown in Table 2, aspect ratios (L/W2 in the embodiment) of the recess portion were compared and evaluated.

TABLE 2

| Aspect Ratio of Recess portion | 1 | 2 | 7.5 | 10 | 20 |
| --- | --- | --- | --- | --- | --- |
| Wear Resistance (Index) | 99 | 100 | 100 | 98 | 95 |
| Braking Performance on Slippery Road Surface (Index) | 95 | 98 | 100 | 100 | 98 |
| Braking Performance on Dry Road Surface (Index) | 99 | 100 | 100 | 99 | 99 |

(5-2-3) Evaluation Result 3

Then, as shown in Table 3, ratios (W2L/W0 in the embodiment) of the width of the recess portion to the width of the land portion were compared and evaluated.

TABLE 3

| | Lateral Width Ratio of Recess portion to Rib Width | | | | |
|---|---|---|---|---|---|
| | 5% | 10% | 15% | 20% | 30% |
| Wear Resistance (Index) | 97 | 99 | 100 | 99 | 95 |
| Braking Performance on Slippery Road Surface (Index) | 95 | 98 | 100 | 100 | 98 |
| Braking Performance on Dry Road Surface (Index) | 101 | 100 | 100 | 98 | 95 |

(5-2-4) Evaluation Result 4

Subsequently, as shown in Table 4, ratios (D1/D0 in the embodiment) of the depth of the recess portion to the width of the land portion were compared and evaluated.

TABLE 4

| Depth Ratio of Recess portion | 1% | 2.5% | 8% | 50% | 80% |
|---|---|---|---|---|---|
| Wear Resistance (Index) | 95 | 99 | 100 | 98 | 95 |
| Braking Performance on Slippery Road Surface (Index) | 95 | 98 | 100 | 100 | 97 |
| Braking Performance on Dry Road Surface (Index) | 100 | 100 | 100 | 97 | 95 |

(5-2-5) Comprehensive Evaluation

As shown in Tables 1 to 4, it was found that Example in which the recess portions were provided exhibited a higher wear resistance and a higher WET braking performance.

(6) Operations and Effects

In the embodiment, the recess portion 23 recessed inward in the tire radial direction from the surface of the land portion 15 is formed in the surface of each wide land portion 21A. In this configuration, when the tread comes into contact with the road surface and the land portion 15 deforms, rubber in the deformed portion moves into the recess portion 23 and thus the recess portion 23 serves as an escape for the land portion 15. The rigidity of the land portion 15 (the wide land portions 21A and the narrow land portions 21B) is more likely to be uniform in the tire circumferential direction. Accordingly, the ground contact pressure of the land portion 15 is made to be uniform in the tire circumferential direction and uneven wear resistance can be thus improved.

In addition, water between the tread and the road surface can be absorbed by the recess portions 23 and drainage performance is thus further surely improved.

In the embodiment, each recess portion 23 is formed in such a tapered shape in the tread surface view that the width dimension of the recess portion 23 in the tread width direction gradually becomes smaller toward the end portions in the tire circumferential direction. In this configuration, the balance of the rigidity between the wide land portions 21A and the narrow land portions 21B is likely to be kept uniform, and thus uneven wear resistance can be further improved.

In the embodiment, the length L of each recess portion 23 is set to be twice to ten times the largest width dimension W2 of the recess portion 23. Note that when the length L of the recess portion 23 is smaller than the twice the largest width dimension W2 of the recess portion 23, the recess portion 23 is too large in the tread width direction and there is a case where the rigidity of the land portion 15 becomes too low. Meanwhile, when the length L of the recess portion 23 is larger than the ten times the largest width dimension W2 of the recess portion 23, the recess portion 23 is too small in the tread width direction and there is a case where the rigidity of the land portion 15 becomes too high.

In the embodiment, the largest width dimension W2 of each recess portion 23 is set to be 10% to 20% of the largest width dimension W0 of each wide land portion 21A. Note that when the largest width dimension W2 of the recess portion 23 is smaller than 10% of the largest width dimension W0 of the wide land portion 21A, the recess portion 23 is too small in the tread width direction and there is a case where the rigidity of the land portion 15 becomes too high. Meanwhile, when the largest width dimension W2 of the recess portion 23 is larger than 20% of the largest width dimension W0 of the wide land portion 21A, the recess portion 23 is too large in the tread width direction and there is a case where the rigidity of the land portion 15 becomes too low.

In the embodiment, the depth D1 of each recess portion 23 is preferably set to be 2.5% to 50% of the depth D0 of the circumferential groove 3. Note that when the depth D1 of the recess portion 23 is shallower than 2.5% of the depth D0 of the circumferential groove 3, the capacity (volume) of the recess portion 23 is too small and there is a case where water between the tread and the road surface is not smoothly absorbed by the recess portion 23. Meanwhile, when the depth D1 of the recess portion 23 is deeper than 50% of the depth D0 of the circumferential groove 3, the capacity of the recess portion 23 is too large and there is a case where the rigidity of the land portion 15 becomes too low.

(7) Other Embodiments of Present Invention

As described above, the contents of the present invention have been disclosed by using the embodiment. However, the description and drawings which constitute part of this disclosure do not limit the present invention. From this disclosure, various alternative embodiments and the like will be found by those skilled in the art.

For example, the tire may be the pneumatic tire 1 filled with air, nitrogen gas, or the like, or may be a solid tire filled with no air, nitrogen gas, or the like.

Additionally, in the embodiment, each recess portion 23 has an elliptical shape. However, the recess portion 23 only needs to have a tapered shape such as a rhomboid where the width dimension of the recess portion 23 gradually becomes smaller toward the end portions in the tire circumferential direction.

As described above, the present invention naturally includes various embodiments which are not described herein. Accordingly, the technical scope of the present invention should be determined only by the matters to define the invention in the scope of claims regarded as appropriate based on the description.

Note that the entire content of Japanese Patent Application No. 2010-026818 (filed on Feb. 9, 2010) is incorporated herein by reference.

INDUSTRIAL APPLICABILITY

The present invention can provide a tire improved in wear resistance in addition to drainage performance, and is thus useful in the automobile industry and the like.

EXPLANATION OF THE REFERENCE NUMERALS 1 pneumatic tire
3, 5 circumferential groove 7 lug groove
9 lateral groove
11, 13, 15 land portion
17, 19A, 19B groove side wall
21A wide land portion
21B narrow land portion
23 recess portion

The invention claimed is:

1. A tire comprising:
  a first main groove extending linearly along a tire circumferential direction:
  a second main groove extending along the tire circumferential direction including a first groove wall and a second groove wall and disposed on the outer side in a tread width direction in relation to a tire equator line and:
    a first land portion partitioned by the first main groove and the second main groove into a rib shape and having a first groove wall; and
    a second land portion formed in a rib shape and having a second groove wall, the second land portion separated from the first land portion by the second main groove extending in the tire circumferential direction, wherein
  the first groove wall and the second groove wall meander in the tire circumferential direction in a tread surface view,
  a groove width of the second main groove in a tread width direction changes in predetermined cycles in the tire circumferential direction,
  the first land portion includes:
    a plurality of wide land portions in which a width of the first land portion in the tread width direction is a predetermined width; and
    a plurality of narrow land portions in which the width of the first land portion in the tread width direction is narrower than the predetermined width, and
  a surface of each of the plurality of wide land portions is provided with one of a plurality of recess portions recessed inward in a tire radial direction from a surface of the first land portion;
  in the tread surface view, the first groove wall and the second groove wall are symmetric to each other with respect to a center line passing through a center of the second main groove in the tread width direction;
  a plurality of raised portions protruding outward in the tire radial direction on a groove bottom of the second main groove, formed in the second main groove,
  the plurality of raised portions are only formed in portions of the second main groove where the width of the second main groove in the tread width direction is wide,
  wherein in the tread surface view, the plurality of recess portions is formed in such a tapered shape that a width dimension of the plurality of recess portions in the tread width direction gradually becomes smaller toward end portions of the plurality of recess portions in the tire circumferential direction,
  wherein the second land portion is provided with lug grooves,
  wherein all the lug grooves include a groove end at least on one side near to the second main groove in the tread width direction and configured not to communicate with the second main groove,
  wherein each end of each raised portion in the tire circumferential direction is disposed separately from a neighboring recess portion in the tire circumferential direction, and
  wherein the plurality of raised portions are alternately disposed with each respective recess portion of the plurality of recess portions in the tire circumferential direction.

2. The tire according to claim 1, wherein
  a length of the plurality of recess portions in the tire circumferential direction is set to be twice to ten times a largest width dimension of the plurality of recess portions in the tread width direction, and
  the largest width dimension of the plurality of recess portions in the tread width direction is set to be 10% to 20% of a largest width dimension of the wide land portion in the tread width direction.

3. The tire according to claim 1, wherein
  a depth of the plurality of recess portions in the tire radial direction is set to be 2.5% to 50% of a depth of the second main groove in the tire radial direction.

4. The tire according to claim 1, wherein
  the plurality of raised portions is formed in a shape elongated in the tire circumferential direction in the tread surface view.

5. The tire according to claim 1, wherein
  the plurality of raised portions is disposed separately from the first groove wall and the second groove wall.

* * * * *